US011929018B2

(12) United States Patent
Youn et al.

(10) Patent No.: US 11,929,018 B2
(45) Date of Patent: Mar. 12, 2024

(54) DISPLAY PWM DUTY CYCLE COMPENSATION FOR DELAYED RENDERING

(71) Applicant: GOOGLE LLC, Mountain View, CA (US)

(72) Inventors: Sang Young Youn, Cupertino, CA (US); Sun-il Chang, San Jose, CA (US); Wonjae Choi, San Jose, CA (US); Hyunchul Kim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 98 days.

(21) Appl. No.: 17/291,807

(22) PCT Filed: May 19, 2020

(86) PCT No.: PCT/US2020/033637

§ 371 (c)(1),
(2) Date: May 6, 2021

(87) PCT Pub. No.: WO2021/236069

PCT Pub. Date: Nov. 25, 2021

(65) Prior Publication Data

US 2022/0310001 A1 Sep. 29, 2022

(51) Int. Cl.
*G09G 3/3208* (2016.01)
*G09G 3/34* (2006.01)

(52) U.S. Cl.
CPC ......... *G09G 3/3208* (2013.01); *G09G 3/3406* (2013.01); *G09G 2310/08* (2013.01);
(Continued)

(58) Field of Classification Search
CPC ....................... G09G 3/3406; G09G 2320/064
See application file for complete search history.

(56) References Cited

U.S. PATENT DOCUMENTS 9,495,926 B2 11/2016 Tripathi et al.
9,786,255 B2 10/2017 Verbeure et al.
(Continued)

FOREIGN PATENT DOCUMENTS

CN 102472903 A 5/2012
TW 201342347 A 10/2013
WO 2021201844 A1 10/2021

OTHER PUBLICATIONS blurbusters.com, "Electronic Hacking: Creating a Strobe Backlight," Jul. 14, 2013; downloaded from <<https://blurbusters.com/faq/creating-strobe-backlight/>>, 32 pages.
(Continued)

*Primary Examiner* — Nan-Ying Yang

(57) ABSTRACT

A frame generation subsystem renders a sequence of frames and a display control subsystem provides a brightness control signal configured to control a brightness of frames displayed at a display panel via pulse width modulation (PWM) of the brightness control signal and determines a deviation in a duty cycle of a first PWM period of the brightness control signal from a default duty cycle resulting from a delayed rendering of a frame. The display control subsystem adjusts a duty cycle of at least a second PWM period to compensate for the deviation in the duty cycle of the first PWM period. The resulting average duty cycle of the brightness control signal over the two frame periods is approximately equal to a default duty cycle and thereby mitigates viewable flicker resulting from the duty cycle change caused by the delayed rendering.

20 Claims, 5 Drawing Sheets

(52) U.S. Cl.
CPC ............... *G09G 2320/0247* (2013.01); *G09G 2320/064* (2013.01); *G09G 2320/10* (2013.01)

(56) References Cited

U.S. PATENT DOCUMENTS

| | | | | |
|---|---|---|---|---|
| 2008/0136355 | A1 | 6/2008 | Han et al. | |
| 2008/0204121 | A1* | 8/2008 | Huang ................ | G09G 3/3614 345/87 |
| 2011/0175935 | A1 | 7/2011 | S et al. | |
| 2013/0021386 | A1* | 1/2013 | Min ..................... | G09G 3/3413 345/102 |
| 2013/0314454 | A1 | 11/2013 | Jin et al. | |
| 2013/0321254 | A1* | 12/2013 | Kim ..................... | G09G 3/2014 345/102 |
| 2014/0375679 | A1 | 12/2014 | Margolis et al. | |
| 2017/0092178 | A1 | 3/2017 | Lee et al. | |
| 2018/0007311 | A1 | 1/2018 | Kato et al. | |
| 2018/0090080 | A1 | 3/2018 | Chen et al. | |
| 2019/0340973 | A1 | 11/2019 | Kim | |
| 2020/0082768 | A1 | 3/2020 | Oh et al. | |
| 2020/0135146 | A1 | 4/2020 | Lee et al. | |
| 2021/0065621 | A1* | 3/2021 | Lee ...................... | G09G 3/3426 |

OTHER PUBLICATIONS

St Microelectronics, "STM32H7—DSI Host: Display Serial Interface Host," Revision 1.0; downloaded from <<https://www.st.com/content/ccc/resource/training/technical/product_training/group0/04/62/1b/8e/e0/bc/4a/cb/STM32H7-Peripheral-DSI_HOST_interface_DSIHOST/files/STM32H7-Peripheral-DSI_HOST_interface_DSIHOST.pdf/_jcr_content/translations/en.STM32H7-Peripheral-DSI_HOST_interface_DSIHOST.pdf>> Sep. 26, 2016; 20 pages.

International Search Report and Written Opinion dated Nov. 30, 2020 for corresponding International Application No. PCT/US2020/033637 pp. 17.

International Preliminary Report on Patentability dated Dec. 1, 2022 for PCT Application No. PCT/US2020/033637, 12 pages.

* cited by examiner

DISPLAY PWM DUTY CYCLE COMPENSATION FOR DELAYED RENDERING

CROSS-REFERENCE TO RELATED APPLICATIONS

The present application is a U.S. National Stage under 35 U.S.C. § 371 of International Patent Application Serial No. PCT/US2020/033637, entitled "DISPLAY PWM DUTY CYCLE COMPENSATION FOR DELAYED RENDERING" and filed on 19 May 2020, the entireties of which are incorporated by reference herein.

BACKGROUND

Some video display systems utilize a pulse width modulation (PWM) scheme to control the brightness of a display panel displaying a corresponding video frame. A digital control signal that controls a backlight in a transmissive display panel or directly controls the pixel intensities in an emissive display panel is pulse width modulated such that resulting brightness of the display panel is proportional to the duty cycle of the resulting PWM signal. Any change in the effective duty cycle of the control signal between two successive frame periods thus introduces a corresponding change in brightness at the display panel between the two successive frame periods. In display systems employing a variable refresh rate, the delay in rendering or other generation of a video frame can result in misalignment of the display of the delayed frame or subsequent frames relative to the PWM control signal. As a result, the effective duty cycle of the PWM control signal may change between successive frames. This change in effective duty cycle of the PWM control signal thus may cause one frame to have a lower or greater brightness than the next frame (depending on whether the effective duty cycle increases or decreases between the two frames). This change in brightness between successive frames often is perceivable to a viewer as flicker, which detracts from the viewing experience.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
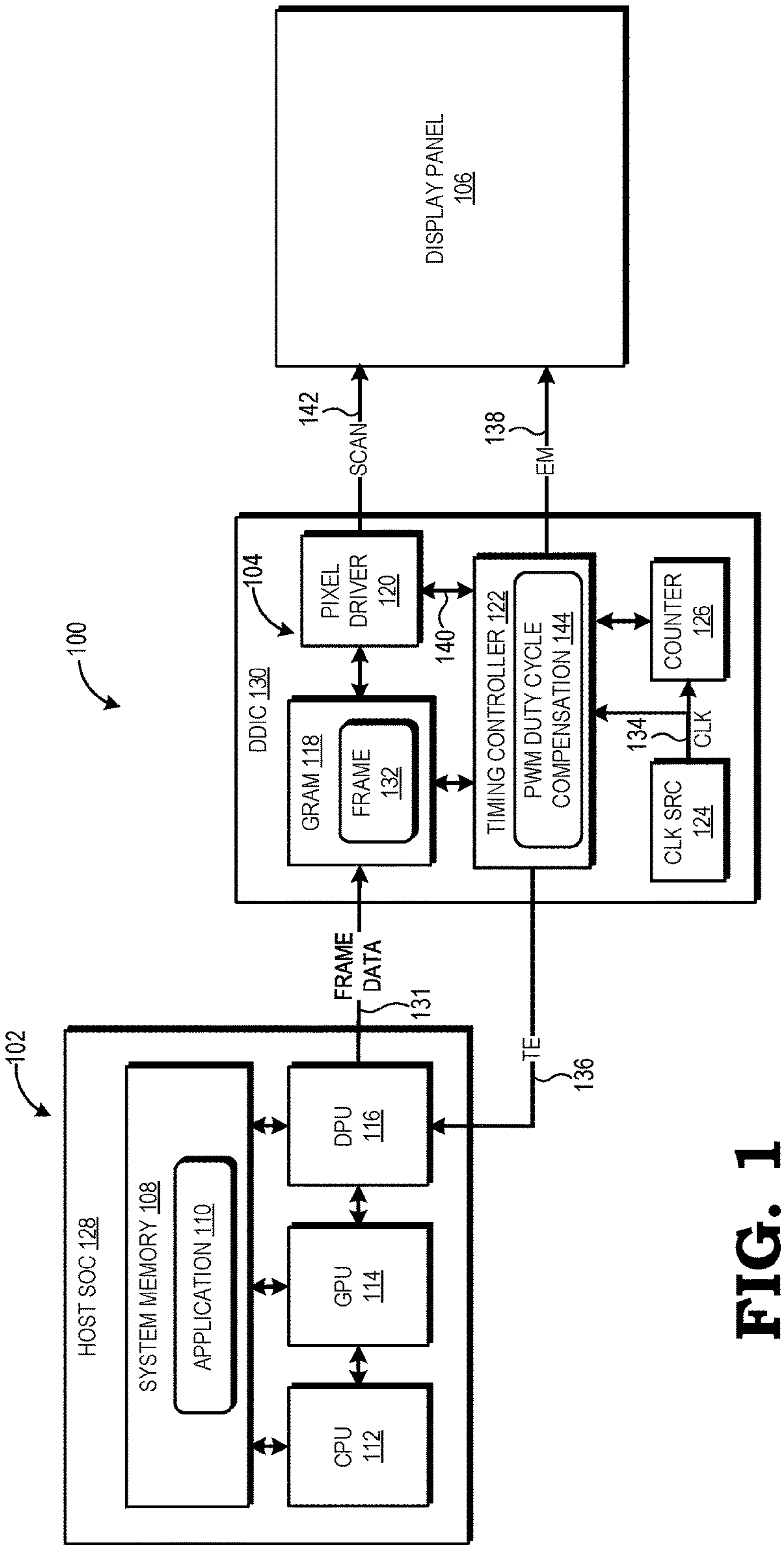
FIG. 1 is a block diagram illustrating a display system employing a PWM duty cycle compensation technique in accordance with at least one embodiment.

FIG. 1 illustrates a display system 100 employing a PWM duty cycle compensation scheme for mitigating PWM duty cycle distortion in a brightness control signal resulting from delayed rendering of frames. The display system 100 can include any of a variety of systems for the rendering, decoding, or other generation of a sequence of video frames for display, such as a desktop computer, a notebook computer, a tablet computer, a compute-enabled cellular phone, a server, a gaming console, a television, a compute-enabled watch or other wearable, and the like. The display system 100 includes a frame generation subsystem 102, a display control subsystem 104, and a display panel 106. The frame generation subsystem 102 operates to generate a sequence of video frames (hereinafter, simply "frames") for display and includes a system memory 108 storing one or more software applications 110 and a set of one or more processors, such as one or more central processing units (CPUs) 112, one or more graphics processing units (GPUs) 114, and one or more display processing units (DPUs) 116.

The display control subsystem 104, in one embodiment, includes a graphics random access memory (GRAM) 118 or other memory operating as frame buffer, a pixel driver 120, a timing controller 122, one or more clock sources 124, and one or more counters 126. The pixel driver 120 and the timing controller 122 are implemented via hardwired logic (e.g., an integrated circuit), programmable logic (e.g., a programmable logic device), one or more processors executing software instructions, or combinations thereof. In the illustrated embodiment, the components of the frame generation subsystem 102 are implemented together in a host system-on-a-chip (SoC) 128 while the components of the display control subsystem 104 are implemented on a separate display driver integrated circuit (DDIC) 130. However, in other embodiments the components of both subsystems 102, 104 are implemented on the same IC or same SoC, or different combinations of components are implemented on different ICs or SoCs. The display panel 106 can include any of a variety of display panels configurable to provide brightness control via PWM duty cycle control, such as a liquid crystal display (LCD) panel, a light emitting diode (LED) panel, an organic LED (OLED) panel, an active-matrix OLED (AMOLED) panel, and the like.

As a general operational overview, the CPU 112 executes the software application 110, which may represent a video game, virtual reality (VR) or augmented reality (AR) application, or other software applications executed to produce a series of frames for display. As part of this execution process, the CPU 112 directs the GPU 114 to render or otherwise generate each frame in the sequence, and the DPU 116 performs one or more post-rendering processes on the frame, such as gamma correction or other filtering, color format conversion, and the like. The frame data 131 for the resulting frame 132 is then transmitted to the display control subsystem 104 for buffering in the GRAM 118.

At the display control subsystem 104, the timing controller 122 uses one or more clock (CLK) signals 134 provided by the one or more clock sources 124 and one or more counters 126 to generate various control signals, including a tearing effect (TE) signal 136, a brightness control signal 138, as well as a vertical blank (VSYNC) signal and a scan start signal (not shown in FIG. 1). The TE signal 136 is used to synchronize the transfer of the next frame 132 from the frame generation subsystem 102 to the GRAM 118 so as to mitigate screen tearing artifacts resulting from overwriting the current frame before the last row of the current frame has been displayed at the display panel 106. The brightness control signal 138 is a pulse-width-modulated digital signal used to control the brightness of the display panel 106. In implementations where the display panel 106 is implemented as an LCD panel or other transmissive display panel, the brightness control signal 138 represents the PWM control signal used to activate the backlight of the transmissive display panel. For emissive display panels, such as OLED and AMOLED display panels, an emission control (EM) signal that is provided to every active pixel is pulse width modulated at a certain duty cycle so as to control the brightness of the corresponding pixels, and in such instances the brightness control signal 138 represents this EM signal. As the following description primarily refers to an OLED-based or AMOLED-based implementation for the display panel 106, the brightness control signal 138 is also referred to herein as the "EM signal 138", but reference to an EM signal applies equally to other forms of PWM-based brightness control unless otherwise noted.

The timing controller 122 uses timing signaling and other control signaling 140 to control the pixel driver 120 to drive the display panel 106 to display a frame 132 from the GRAM 118 by scanning the frame data 131 of the frame 132 from the GRAM 118 into the pixel array (not shown) of the display panel 106 with row-line addressing, with the transfer of the pixel data from the pixel driver 120 to the display panel 106 represented by a SCAN signal 142. The pixels of each row are activated so as to emit display light in accordance with the corresponding pixel values for that row, with the brightness of the emitted display light controlled at least in part by the PWM duty cycle of the EM signal 138 during the frame period for display of the corresponding frame 132. In some embodiments, the magnitude of the EM signal 138 also can be adjusted to further control the intensity of the emitted light.

In at least one embodiment, the display system 100 supports a variable refresh rate such that rather requiring that the sequence of frames be rendered and displayed at a fixed frame rate, the frame rate can be modified to accommodate frames that may take different amounts of time to render. To illustrate, the complexity of a frame to be rendered or the current resources available to render a given frame may result in the rendering an preparation of the frame taking more time than is available at the nominal current frame rate, and thus the system can instead utilize dynamically and temporarily adjust the frame period for the render-delayed frame. However, because the frame period for a first frame may differ from the frame period for a second frame adjacent to the first frame in a variable refresh rate configuration, there is potential for the effective duty cycle of the EM signal 138 during the frame period for the first frame to differ from the effective duty cycle of the EM signal 138 during the frame period for the second frame, which in turn leads to a change in brightness from the first frame to the second frame, which has the potential to be detected by the viewer as distracting flicker.

Accordingly, in at least one embodiment, the timing controller 122 employs a PWM duty cycle compensation scheme 144 in which a deviation in the PWM duty cycle of the EM signal 138 for a frame period impacted by a rendering-delayed frame (hereinafter, the "rendering-delayed frame period") from a nominal PWM duty cycle is determined, and then the effective PWM duty cycle of the EM signal 138 is compensatorily adjusted in an opposite manner for one or more PWM periods in the frame period following the rendering-delayed frame period (this frame period being referred to herein as the "compensatory frame period"). By adjusting the effective duty cycle of the EM signal 138 for the compensatory frame period so as to compensate for a deviation in effective PWM duty cycle introduced for the rendering-delayed frame period, the timing controller 122 can provide an EM signal 138 that, over these two frame periods, has an average effective PWM duty cycle that is approximately equal to the default, or nominal, PWM duty cycle intended for these two frame periods. This results in an average effective brightness output at the display panel 106 that is relatively consistent with the nominal PWM duty cycle and corresponding nominal brightness level intended for the two frame periods in the absence of delayed frame rendering.

Figure 2:
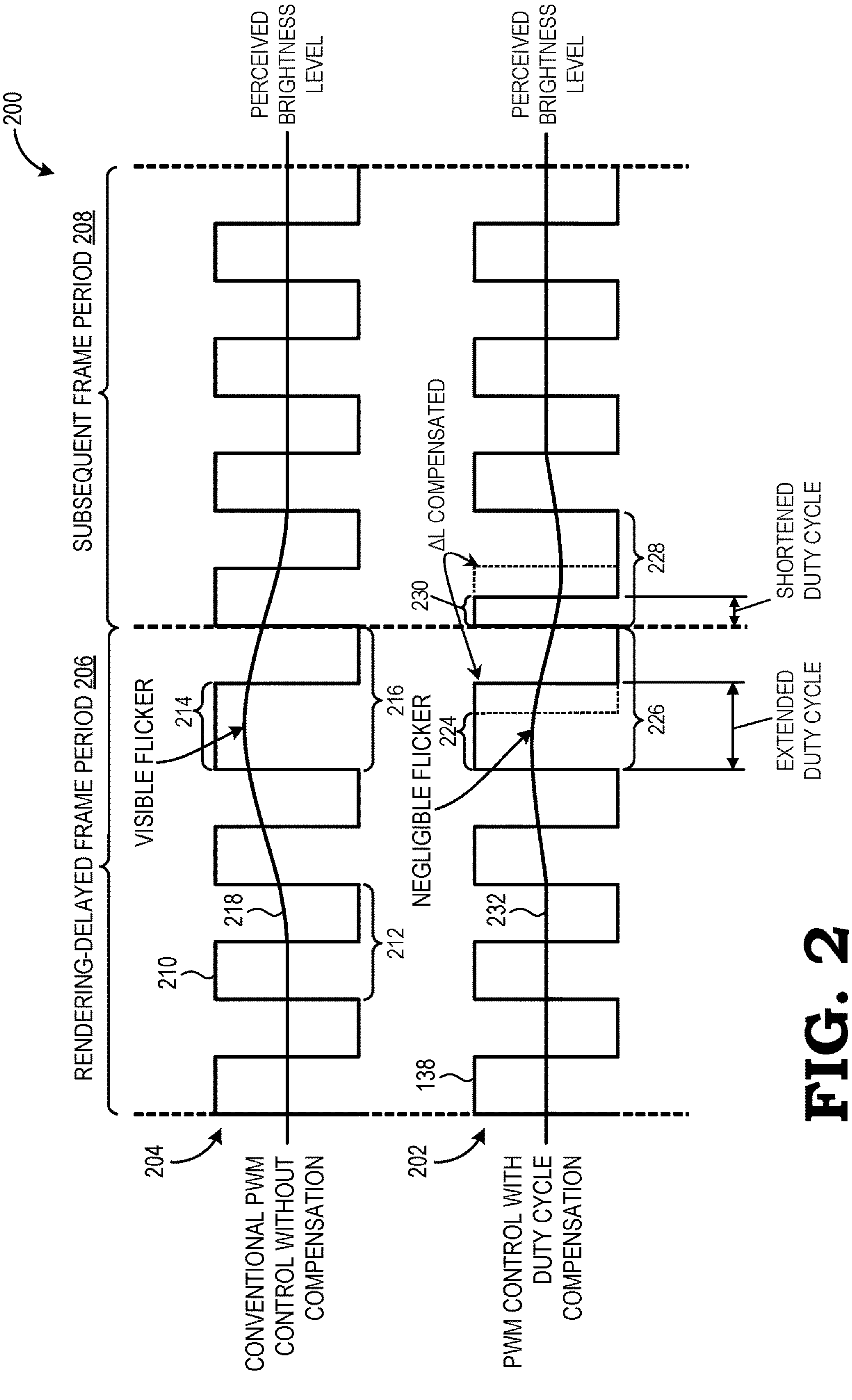
FIG. 2 is a timing diagram illustrating an example comparison of a conventional approach to PWM-based display brightness control in the presence of a rendering-delayed frame to an example implementation of the PWM duty cycle compensation technique in the same circumstances.

FIG. 2 illustrates a timing diagram 200 depicting a general example operation of the PWM duty cycle compensation scheme 144 (represented by timing section 202 of the timing diagram 200) in accordance with some embodiments, along with a comparison with a conventional approach that lacks compensation for duty cycle deviations (represented by timing section 204 of the timing diagram 200). The timing diagram 200 illustrates two successive frame periods: a rendering-delayed frame period 206 that is concurrent with the rendering of a frame for which completion of rendering has been delayed to an extent that the duration of the frame period 206 has been extended and a following frame period 208 following the rendering-delayed frame period 206 (and for which the a concurrent frame is timely rendered). Both an EM signal 210 provided to control display brightness in a conventional approach and the aforementioned EM signal 138 have the same nominal PWM duty cycle represented by, for example, PWM period 212 of EM signal 210.

In this example, the delayed rendering of the frame during rendering-delayed frame period 206 causes a conventional timing controller to stretch out the high voltage level portion 214 of the last PWM period 216 in the frame period 206 for the EM signal 210, resulting in a modified duty cycle for the PWM period 216 that is higher than the nominal duty cycle of the EM signal 210. Then, for the PWM periods of the following frame period 208, the EM signal 210 maintains the nominal PWM duty cycle. As illustrated by line 218 of timing section 204, which represents a brightness level of the corresponding display panel as perceived by a viewer over time and resulting from the EM signal 210, the increase in effective duty cycle in the PWM period 216 causes a relatively substantial increase in perceived brightness for a relatively brief moment of time. This typically would be perceived by the viewer as visible or otherwise noticeable flicker, and thus detracting from the viewer's experience.

Turning to the example operation of the PWM duty cycle compensation scheme 144 in the same circumstances, the EM signal 138 likewise experiences an increase in its effective duty cycle for a last PWM period 226 of the rendering-delayed frame period 206 due to the delayed rendering of the frame causing an high voltage level portion 224 of this PWM period 226 to stretch out. However, as described in greater detail below, in accordance with the PWM duty cycle compensation scheme 144, the timing controller 122 detects the change in effective duty cycle from PWM period 226 caused by delayed rendering, and then adjusts the effective duty cycle in the first PWM period 228 of subsequent frame period 208 in the opposite manner so as to compensate for the deviation of the duty cycle of the PWM period 226 from the nominal duty cycle. In this particular example, because the high voltage level portion 224 is increased by an amount $\Delta L$ (=L2−L1, where L2 represents the duration of the high voltage level portion of PWM period 226 and L2 represents the duration of the high voltage level portion of the nominal, or default, PWM period), the high voltage level portion 230 of the PWM period 228 is reduced by the amount ΔL. That is, the deviation of +ΔL in the duty cycle of the PWM period 226 results in a corresponding adjustment of +ΔL in the duty cycle of the following PWM period 228. As a result, the effective PWM duty cycle as averaged over the PWM period 226 and the PWM period 228 matches the nominal duty cycle. Accordingly, as illustrated by line 232 of timing section 202, which represents the brightness level of the display 106 as perceived by a viewer and resulting from the EM signal 138, the momentary increase in brightness caused by the increase in the effective PWM duty cycle in PWM period 226 is counteracted by a corresponding compensatory momentary decrease in brightness caused by the decrease in the effective PWM duty cycle in PWM period 228, which in turn results in the presentation of negligible flicker to the viewer.

Figure 3:
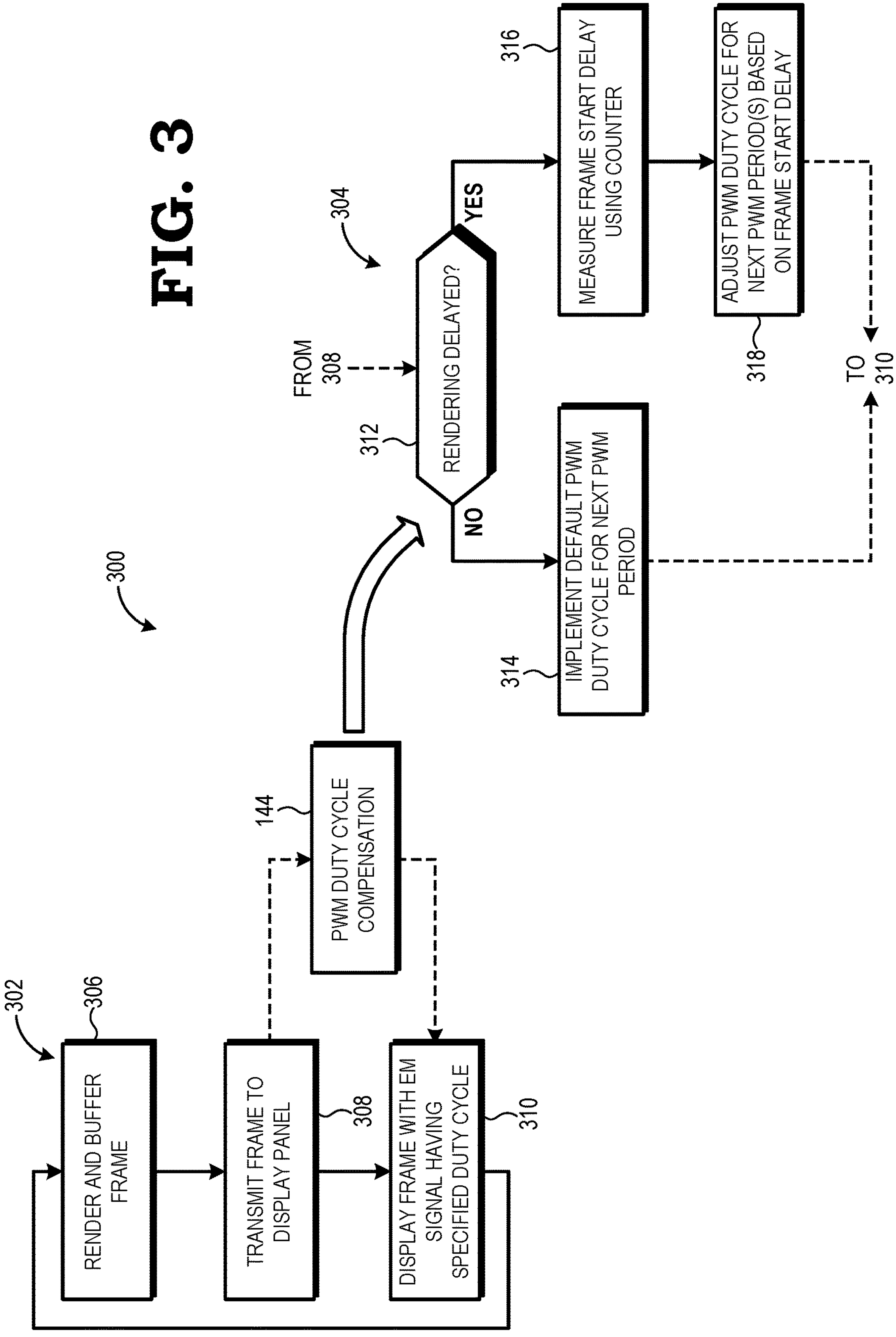
FIG. 3 is a flow diagram illustrating a method for PWM duty cycle compensation for display brightness control in accordance with some embodiments.

FIG. 3 illustrates a method 300 of operation of the display system 100 of FIG. 1 in rendering and displaying a stream or other sequence of frames utilizing the PWM duty cycle compensation scheme 144 in accordance with some embodiments. In the illustrated example, the method 300 is composed of two concurrent processes: a render/display process 302 for generating and displaying the sequence of frames and a PWM duty cycle configuration process 304 (representative of the PWM duty cycle compensation scheme 144) for setting and dynamically changing the PWM duty cycles for the PWM periods of the EM signal 138, and in the event of a rendering-delayed frame, compensating for any PWM duty cycle variations introduced in one or more PWM periods of a frame period by a rendering-delayed frame by inversely adjusting the PWM duty cycle of one or more PWM periods in the subsequent frame period.

An iteration of the render/display process 302 initiates at block 306, whereby the frame generation subsystem 102 renders a frame 132 and buffers the frame 132 in the GRAM 118. At block 308, the timing controller 122 and the pixel driver 120 coordinate to transfer the pixel data of the frame 132 from the GRAM 118 to the display panel 106 via the SCAN signal 142, and at block 310 the display panel 106 displays the selected frame 132 with a brightness controlled at least in part on the effective PWM duty cycle of the EM signal 138 over the frame period. In some embodiments, the display panel 106 begins the display of already-received rows of pixels of the selected frame 132 while subsequent rows are still being transferred. In other embodiments, the entirety of the selected frame 132 is transmitted to the display panel 106 before display of the frame 132 is initiated.

Each iteration of the render/display process 302 includes configuration of the PWM duty cycle to be implemented by each PWM period of the EM signal 138 based at least in part on detection of a prior deviation of the duty cycle from a specified nominal duty cycle. In one embodiment, this aspect is controlled by the timing controller 122 of the display control subsystem 104 in accordance with the PWM duty cycle compensation scheme 144 represented by the duty cycle configuration subprocess 304. As a general overview of the scheme 144, the PWM duty cycle is configured to default to a nominal duty cycle corresponding to an intended brightness during display of a corresponding frame during a frame period. However, when a delayed rendering of a frame results in a deviation in the PWM duty cycle from the nominal duty cycle for one or more successive PWM periods, the timing controller 122 operates to compensate for this deviation by adjusting the duty cycle of one or more subsequent PWM periods in an opposite manner, thereby resulting in an average PWM duty cycle across all of the impacted PWM periods that is approximately equal to the nominal PWM duty cycle.

Accordingly, at block 308 the timing controller 122 monitors the frame rendering and transmission processes of block 306 and 308 for an indication that rendering of the current frame is, or will be, “delayed”; that is, the rendering of the current frame is taking sufficiently long that the current frame may or will not be ready for scan out to the display panel 106 (block 308) when the frame period for the previous frame (that is, the frame currently being displayed) ends and the frame period for the next frame to be displayed begins. To illustrate, in some embodiments, a specified signal is provided by the frame generation subsystem 102 to signal completion of rendering of a frame, such as through transmission of a 2C data packet. For a given frame rate, this signal is provided within a specified delay following assertion of the TE signal 136. As such, failure to receive this specified signal within the corresponding delay following assertion of the TE signal 136 indicates that rendering of the frame is delayed.

In the absence of an indication of a late/delayed rendering for the current frame being rendered (e.g., in response to determining that the current frame has finished rendering by a certain time or threshold associated with the target frame rate), then at block 314 the timing controller 122 sets the PWM duty cycle for the one or more PWM periods of the EM signal 138 for the next frame period (that is, the frame period following the current frame period) to the default, or nominal, PWM duty cycle for a corresponding indicated brightness level for displaying the frame. Returning to block 312, if the timing controller 122 instead detects delayed rendering for the current frame, then at block 316 the timing controller 122 initiates a counter (e.g., counter 126 of FIG. 1) to determine a measure of the delay caused by the delayed rendering of the current frame to the extent it causes the duty cycle of one or more PWM periods of the current frame period to deviate from the default duty cycle set for the indicated brightness level. With the termination of the current frame, at block 318 the timing controller 122 then determines an adjustment to one or more of the initial PWM periods in the following frame period to as to compensate for the deviance in the effective PWM duty cycle of the last frame period caused by the delayed rendering. The timing controller 122 then stores a value or other indicator of the determined adjustment or the resulting adjusted duty cycle to be implemented for the next frame period to a register, table, or other storage element, and then at an iteration of the display process of block 310 for the following frame period, retrieves this indicator to configure the EM signal 138 to provide the one or more PWM periods with the adjusted PWM duty cycle during the next frame period.

In at least one embodiment, the compensatory adjustment implemented at block 318 is based on the change in PWM duty cycle such that an opposite change in PWM duty cycle is introduced in one or more PWM periods of the next frame period. That is, an increase in the duty cycle of one or more PWM periods in the rendering-delayed frame period results in an adjustment that commensurately decreases the duty cycle of one or more PWM periods in the following compensatory frame period and, conversely, a decrease in the duty cycle of one or more PWM periods in the rendering-delayed frame period results in an adjustment that commensurately decreases the duty cycle of one or more PWM periods in the following compensatory frame period. As described in greater detail below with reference to FIG. 5, when the active-high voltage level of the EM signal 138 is constant between the two frame periods, the net change in the total duration at which the EM signal 138 is at the active-high voltage during the rendering-delayed frame period from the total duration for the default duty cycle results in an equal in magnitude and opposite in direction change in the total duration at which the EM signal 138 is at the active-high voltage during the subsequent frame period. In implementations where the active-high voltage level of the EM signal changes between frame periods, the adjustment to the duty cycle in the subsequent frame period is scaled based on a ratio of the high voltage level of the rendering-delayed frame period to the high voltage level of the subsequent frame period.

Figure 4:
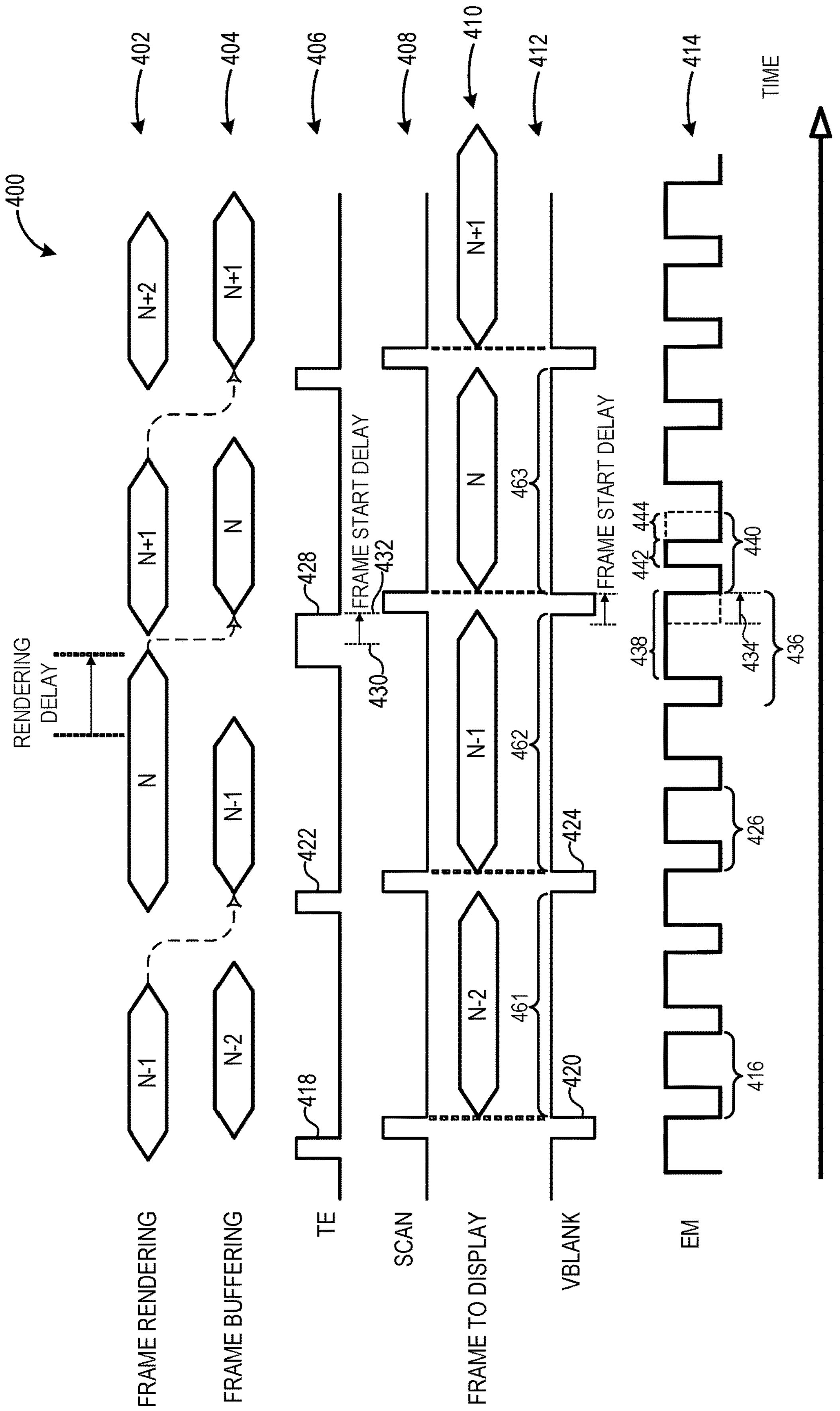
FIG. 4 is a timing diagram illustrating an example of the method of FIG. 3 in accordance with some embodiments.

FIG. 4 depicts a timing diagram 400 illustrating an example operation of the system 100 in accordance with the method 300 of FIG. 3. For timing diagram 400, the abscissa represents time (increasing from left to right). Timing row 402 represents the rendering process by the GPU 114 (FIG. 1) for each corresponding frame, starting with frame N−1 and ending with frame N+2. Timing row 404 represents the buffering process for transferring the rendered frame data for a frame from the frame generation subsystem 102 to the GRAM 118. Timing row 406 represents the state of the TE signal 136, whereby in this example an active-high pulse in the TE signal 136 signals the frame generation subsystem 102 to begin transferring the next rendered frame to the GRAM 118. Timing row 408 represents the state of the SCAN signal 142 to control the scan out of a frame from the GRAM 118 to the display panel 106 for display, with timing row 410 representing the actual scan out of each frame. Timing row 412 represents the state of a vertical synchronization (VSYNC) signal that in turn represents the timing of each frame period. For this example, the VSYNC signal is synchronized to the active-high pulses in the SCAN signal 142, whereby the VSYNC signal is pulsed active-low in response to a corresponding pulse in the SCAN signal 142, and this pulse in the VSYNC signal initiates commencement of the frame period for the corresponding frame being scanned out and displayed at the display panel 106. Timing row 414 represents the PWM-based EM signal 138. For this example, the default configuration is three PWM periods of the EM signal 138 for every nominal frame period, with the default, or nominal, PWM duty cycle illustrated by, for example, PWM period 416.

The timing diagram 400 starts with the transfer of the pixel data for frame N−2 into the GRAM 118 in response to the first pulse (pulse 418) in the TE signal 136. Concurrently, the GPU 114 begins rendering of frame N−1. At the end of the first pulse (pulse 420) in the VSYNC signal, the timing controller 122 and pixel driver 120 begin the scan out and display of frame N−2 for frame period 461. Note that the delay between the end of the first pulse 420 in the TE signal 136 and the end of the first pulse 420 in the VSYNC signal represents the delay between when a frame 132 is buffered in the GRAM 118 and when that same frame 132 can start scan out to the display panel 106. As shown, the end of this first pulse 420 in the VSYNC signal, and thus the start of the frame period 461, is aligned with the indicated edge of the corresponding PWM period 416 of the EM signal 138. Similarly, as shown in timing diagram 400, rendering of frame N−1 completes on time, and thus with the second pulse 422 in the TE signal 136, the pixel data of rendered frame N−1 is transferred to the GRAM 118, and the VSYNC signal is pulsed for a second pulse 424 to start the next frame period 462 for scan out and display of the frame N−1, with the frame period 462 aligned to the edge of the fifth PWM period 426.

However, as illustrated by the "stretching" of the third pulse 428 of the TE signal 136 used to trigger a third frame period 463, the rendering of frame N has not completed in time; that is, frame N is a rendering-delayed frame. As such, rather than terminating the third pulse 428 of the TE signal 136 at the point 430 at which a pulse in the TE signal 136 otherwise would have been terminated in the absence of a delayed frame, the third pulse 428 is extended to point 432, which represents the point in time where the completion of the rendering of frame N is finally signaled. This difference between point 430 and point 432 (which is the same difference between when the VBLANK signal was expected to pulse and when it actually pulsed due to the rendering delay) represents the "frame start delay"; that is, the amount by which frame 462 was extended and by which the start of the subsequent frame 463 is delayed, as a result of rendering of frame N not timely completing. It will be appreciated that the frame start delay often is less than the frame rendering delay as the default frame period typically is longer than the expected duration expected to render a typical frame.

In response to detecting the rendering delay (e.g., by detecting that the TE signal 136 did not pulse when expected), the timing controller 122 starts the counter 126 and measures the duration 434 between when the end of the frame period 462 was expected to be signaled and when the end was actually signaled. During this same duration, the timing controller 122 configures the EM signal 138 to continue the current PWM period 436 at the high voltage level so that a high voltage level portion 438 of the PWM period 436 is longer than the duration of the high voltage level of the nominal, or default, PWM period 426, resulting in a net increase in the effective PWM duty cycle of the PWM period 436. Accordingly, to compensate for this deviation, for the first PWM period 440 of the following frame period 463, the timing controller 122 configures the EM signal 138 to shorten the length of the high voltage level of the PWM period 440 by a duration 444 equivalent to the measured duration 434, resulting in an abbreviated high voltage level portion 442, which in turn results in a net decrease in the effective PWM duty cycle of the PWM period 440, which offsets the net increase in the effective PWM duty cycle of the preceding PWM period 436.

In this example, the timing controller 122 configures the subsequent PWM periods of the frame period 463 to have the default duty cycle. However, in other embodiments, rather than implementing all of the compensatory adjustment in only the first PWM period of the subsequent frame period, each of a plurality of the initial PWM periods of the subsequent frame period can be configured to implement a part of the compensatory adjustment, where the part of the compensatory adjustment applied to each PWM period can be based on, for example, the number of PWM periods in the plurality. To illustrate by way of an example, if the low voltage level portion of a PWM period during a rendering-delayed frame period is lengthened by 6 milliseconds (ms) as a result of the delayed rendering, then the high voltage level portions of the first two PWM periods in the subsequent frame period each can be lengthened by 3 ms (=6 ms divided by two PWM periods) to compensate.

Figure 5:
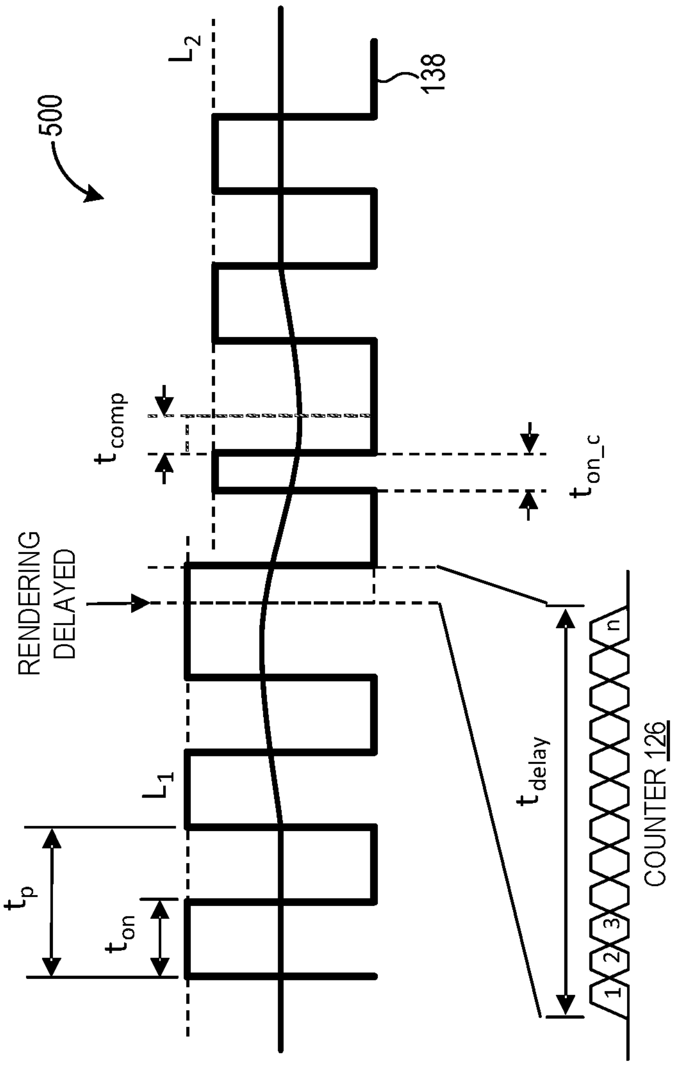
FIG. 5 is a timing diagram illustrating an example technique for determining a compensatory adjustment to the PWM duty cycle of a brightness control signal for a one or more PWM periods of a frame period following a frame period impacted by a rendering-delayed frame in accordance with some embodiments.

FIG. 5 depicts a timing chart 500 for an implementation of the EM signal 138 to illustrate the adjustment calculation process employed by the timing controller 122 to determine the appropriate compensatory adjustment based on the measured duration of the frame start delay caused by a rendering-delayed frame. As illustrated, the EM signal 138 has a default, or nominal, PWM period having a duration denoted $t_p$ and which is composed of a high voltage level portion of duration $t_{on}$ and a low voltage portion of duration $t_p$-$t_{on}$, and thus resulting in a default duty cycle $DC_{orig}=t_{on}/t_p$. As further illustrated by timing chart 500, the high voltage level can differ between frame periods, such as in instances in which the brightness of the display panel 106 is controlled not only through PWM duty cycle but also through the voltage level of the EM signal 138. Thus, the EM signal 138 has a high voltage level of $L_1$ for a rendering-delayed frame period and a high voltage level of $L_2$ for the subsequent frame period, where $L_1$ can be greater than, equal to, or less than $L_2$a.

Accordingly, in response to detecting a delayed rendering of a frame, the timing controller 122 starts the counter 126 to measure the duration (denoted $t_{delay}$) by which the delayed rendering has caused the last PWM period of the rendering-delayed frame period to deviate from the default duration, resulting in a duty cycle $DC_{delay}=[(t_{on}+t_{delay})/(t_p+t_{delay})]$ and then adjusts the first PWM period of the subsequent period by a commensurate duration, denoted $t_{comp}$, with the resulting duration of the high voltage level of the first PWM period of the subsequent period being denoted as $t_{on\_c}$, and thus having a duty cycle $DC_{comp}=t_{on\_c}/t_p$. Given such, the timing controller 122 can determine the compensatory to be implemented $t_{comp}$ and $t_{on\_c}$ using logic configured to implement the following expression:

$$(L_1+L_2)\cdot\frac{t_{on}}{t_p}=L_1\cdot\frac{t_{on}+t_{delay}}{t_p+t_{delay}}+L_2\cdot\frac{t_{on}+t_{comp}}{t_p}$$

In the following a few examples of the aspects described above are provided:

Example 1. A method comprising:

controlling a brightness of frames displayed at a display panel via pulse width modulation (PWM) of a brightness control signal provided to the display panel;

determining a deviation in a duty cycle of a first PWM period of the brightness control signal from a default duty cycle resulting from a delay in rendering of a frame; and adjusting a duty cycle of at least a second PWM period following the first PWM period to compensate for the deviation in the duty cycle of the first PWM period.

Example 2. The method of example 1, wherein:

the deviation in the duty cycle of the first PWM period is an increase in the duty cycle of the first PWM period relative to the default duty cycle; and adjusting the duty cycle of at least the second PWM period comprises decreasing the duty cycle of at least the second PWM period.

Example 3. The method of example 1, wherein:

the deviation in the duty cycle of the first PWM period is a decrease in the duty cycle of the first PWM period relative to the default duty cycle; and adjusting the duty cycle of at least the second PWM period comprises increasing the duty cycle of at least the second PWM period.

Example 4. The method of any of examples 1 to 3, wherein:

determining the deviation in the duty cycle of the first PWM period comprises measuring a duration by which the first PWM period is extended compared to a duration of a default PWM period having the default duty cycle; and adjusting the duty cycle of at least the second PWM period comprises adjusting the duty cycle of at least the second PWM period based on the measured duration.

Example 5. The method of example 4, wherein:

the brightness control signal has a first high voltage level for the first PWM period and a second high voltage level for the second PWM period, the second high voltage level different than the first high voltage level; and adjusting the duty cycle of at least the second PWM period comprises adjusting the duty cycle of at least the second PWM period further based on a ratio of the first high voltage level to the second high voltage level.

Example 6. The method of any of examples 1 to 5, wherein adjusting the duty cycle of at least the second PWM period to compensate for the deviation in the duty cycle of the first PWM period comprises adjusting the duty cycle of at least the second PWM period so that an average duty cycle of the brightness control signal for the first PWM period and at least the second PWM period is approximately equal to the default duty cycle.

Example 7. The method of any of examples 1 to 5, wherein adjusting the duty cycle of at least the second PWM period comprises adjusting the duty cycle of a plurality of PWM periods following the first PWM period based on the deviation, the plurality of PWM periods including the second PWM period, and wherein a duty cycle of each of the plurality of PWM periods is adjusted based on the deviation and based on the number of PWM periods in the plurality of PWM periods.

Example 8. A display system configured to perform the method of any of the preceding examples.

Example 9. A non-transitory computer-readable medium storing a set of executable instructions, the set of executable instructions configured to manipulate at least one processor to perform the method of any of examples 1 to 8.

Example 10. A system comprising:

a frame generation subsystem configured to render a sequence of frames; and a display control subsystem coupled to the frame generation subsystem and coupleable to a display panel, the display control subsystem configured to:

provide a brightness control signal configured to control a brightness of frames displayed at the display panel via pulse width modulation (PWM) of the brightness control signal;

determine a deviation in a duty cycle of a first PWM period of the brightness control signal from a default duty cycle resulting from a delay in rendering of a frame; and adjust a duty cycle of at least a second PWM period following the first PWM period to compensate for the deviation in the duty cycle of the first PWM period.

Example 11. The system of example 10, wherein:

the deviation in the duty cycle of the first PWM period is an increase in the duty cycle of the first PWM period relative to the default duty cycle; and the display control subsystem is configured to adjust the duty cycle of at least the second PWM period by decreasing the duty cycle of at least the second PWM period.

Example 12. The system of example 10, wherein:

the deviation in the duty cycle of the first PWM period is a decrease in the duty cycle of the first PWM period relative to the default duty cycle; and the display control subsystem is configured to adjust the duty cycle of at least the second PWM period by increasing the duty cycle of at least the second PWM period.

Example 13. The system of any of examples 10 to 12, wherein:

the display control subsystem is configured to determine the deviation in the duty cycle of the first PWM period by measuring a duration by which the first PWM period is extended compared to a duration of a default PWM period having the default duty cycle; and the display control subsystem is configured to adjust the duty cycle of at least the second PWM period comprises based on the measured duration.

Example 14. The system of example 13, wherein:

the brightness control signal has a first high voltage level for the first PWM period and a second high voltage level for the second PWM period, the second high voltage level different than the first high voltage level; and the display control subsystem is configured to adjust the duty cycle of at least the second PWM period further based on a ratio of the first high voltage level to the second high voltage level.

Example 15. The system of any of examples 10 to 14, wherein the display control subsystem is configured to adjust the duty cycle of at least the second PWM period to compensate for the deviation in the duty cycle of the first PWM period so that an average duty cycle of the brightness control signal for the first PWM period and at least the second PWM period is approximately equal to the default duty cycle.

Example 16. The system of any of examples 10 to 14, wherein the display control subsystem is configured to adjust the duty cycle of a plurality of PWM periods following the first PWM period, the plurality of PWM periods including the second PWM period, and wherein a duty cycle of each of the plurality of PWM periods is adjusted based on the deviation and on the number of PWM periods in the plurality of PWM periods.

Example 17. The system of any of examples 10 to 16, further comprising:

the display panel.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

A computer-readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

controlling a brightness of frames displayed at a display panel via pulse width modulation (PWM) of a brightness control signal provided to the display panel;

measuring a frame start delay associated with a deviation in a duty cycle of a first PWM period of the brightness control signal relative to a default duty cycle, the frame start delay comprising a duration by which the first PWM period is extended compared to a duration of a default PWM period having the default duty cycle; and adjusting a duty cycle of at least a second PWM period following the first PWM period to compensate for the measured frame start delay.

2. The method of claim 1, wherein:

the deviation in the duty cycle of the first PWM period is an increase in the duty cycle of the first PWM period relative to the default duty cycle; and adjusting the duty cycle of at least the second PWM period comprises decreasing the duty cycle of at least the second PWM period.

3. The method of claim 1, wherein:

the deviation in the duty cycle of the first PWM period is a decrease in the duty cycle of the first PWM period relative to the default duty cycle; and adjusting the duty cycle of at least the second PWM period comprises increasing the duty cycle of at least the second PWM period.

4. The method of claim 1, wherein:

adjusting the duty cycle of at least the second PWM period comprises adjusting the duty cycle of at least the second PWM period by substantially the measured frame start delay.

5. The method of claim 4, wherein:

the brightness control signal has a first high voltage level for the first PWM period and a second high voltage level for the second PWM period, the second high voltage level different than the first high voltage level; and adjusting the duty cycle of at least the second PWM period comprises adjusting the duty cycle of at least the second PWM period further based on a ratio of the first high voltage level to the second high voltage level.

6. The method of claim 1, wherein adjusting the duty cycle of at least the second PWM period to compensate for the deviation in the duty cycle of the first PWM period comprises adjusting the duty cycle of at least the second PWM period so that an average duty cycle of the brightness control signal for the first PWM period and at least the second PWM period is approximately equal to the default duty cycle.

7. The method of claim 1, wherein adjusting the duty cycle of at least the second PWM period comprises adjusting the duty cycle of a plurality of PWM periods following the first PWM period based on the deviation, the plurality of PWM periods including the second PWM period, and wherein a duty cycle of each of the plurality of PWM periods is adjusted based on the deviation and based on the number of PWM periods in the plurality of PWM periods.

8. A system comprising:

a frame generation subsystem configured to render a sequence of frames; and a display control subsystem coupled to the frame generation subsystem and coupleable to a display panel, the display control subsystem configured to:

provide a brightness control signal configured to control a brightness of frames displayed at the display panel via pulse width modulation (PWM) of the brightness control signal;

measure a frame start delay associated with a deviation in a duty cycle of a first PWM period of the brightness control signal relative to a default duty cycle resulting from a delay in rendering of a frame, wherein the frame start delay comprises a duration by which the first PWM period is extended compared to a duration of a default PWM period having the default duty cycle; and adjust a duty cycle of at least a second PWM period following the first PWM period to compensate for the measured frame start delay.

9. The system of claim 8, wherein:

the deviation in the duty cycle of the first PWM period is an increase in the duty cycle of the first PWM period relative to the default duty cycle; and the display control subsystem is configured to adjust the duty cycle of at least the second PWM period by decreasing the duty cycle of at least the second PWM period.

10. The system of claim 8, wherein:

the deviation in the duty cycle of the first PWM period is a decrease in the duty cycle of the first PWM period relative to the default duty cycle; and the display control subsystem is configured to adjust the duty cycle of at least the second PWM period by increasing the duty cycle of at least the second PWM period.

11. The system of any of claim 8, wherein:

the display control subsystem is configured to adjust the duty cycle of at least the second PWM period by substantially the measured frame start delay.

12. The system of claim 11, wherein:

the brightness control signal has a first high voltage level for the first PWM period and a second high voltage level for the second PWM period, the second high voltage level different than the first high voltage level; and the display control subsystem is configured to adjust the duty cycle of at least the second PWM period further based on a ratio of the first high voltage level to the second high voltage level.

13. The system of claim 8, wherein the display control subsystem is configured to adjust the duty cycle of at least the second PWM period to compensate for the deviation in the duty cycle of the first PWM period so that an average duty cycle of the brightness control signal for the first PWM period and at least the second PWM period is approximately equal to the default duty cycle.

14. The system of claim 8, wherein the display control subsystem is configured to adjust the duty cycle of a plurality of PWM periods following the first PWM period, the plurality of PWM periods including the second PWM period, and wherein a duty cycle of each of the plurality of PWM periods is adjusted based on the deviation and on the number of PWM periods in the plurality of PWM periods.

15. The system of claim 8, further comprising:

the display panel.

16. A non-transitory computer readable medium embodying a set of executable instructions, the set of executable instructions to manipulate at least one processor to:

control a brightness of frames displayed at a display panel via pulse width modulation (PWM) of a brightness control signal provided to the display panel;

measure a frame start delay associated with a deviation in a duty cycle of a first PWM period of the brightness control signal relative to a default duty cycle resulting from a delay in rendering of a frame, the frame start delay comprising a duration by which the first PWM period is extended compared to a duration of a default PWM period having the default duty cycle; and adjust a duty cycle of at least a second PWM period following the first PWM period to compensate for the measured frame start delay.

17. The computer readable medium of claim 16, wherein:

the deviation in the duty cycle of the first PWM period is an increase in the duty cycle of the first PWM period relative to the default duty cycle; and adjusting the duty cycle of at least the second PWM period comprises decreasing the duty cycle of at least the second PWM period.

18. The computer readable medium of claim 16, wherein:

the deviation in the duty cycle of the first PWM period is a decrease in the duty cycle of the first PWM period relative to the default duty cycle; and adjusting the duty cycle of at least the second PWM period comprises increasing the duty cycle of at least the second PWM period.

19. The computer readable medium of claim 16, wherein:

adjusting the duty cycle of at least the second PWM period comprises adjusting the duty cycle of at least the second PWM period by substantially the measured frame start delay.

20. The computer readable medium of claim 19, wherein:

the brightness control signal has a first high voltage level for the first PWM period and a second high voltage level for the second PWM period, the second high voltage level different than the first high voltage level; and adjusting the duty cycle of at least the second PWM period comprises adjusting the duty cycle of at least the second PWM period further based on a ratio of the first high voltage level to the second high voltage level.

* * * * *